United States Patent
van Zee

(10) Patent No.: US 7,917,466 B2
(45) Date of Patent: Mar. 29, 2011

(54) AUTOMATICALLY PROCESSING DIGITAL ASSETS OF A DIGITAL CAMERA

(75) Inventor: Pieter J. van Zee, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2117 days.

(21) Appl. No.: 10/080,971

(22) Filed: Feb. 21, 2002

(65) Prior Publication Data
US 2003/0156202 A1    Aug. 21, 2003

(51) Int. Cl.
*G06F 17/30*    (2006.01)
(52) U.S. Cl. ......... 707/609; 707/756; 707/802; 707/809
(58) Field of Classification Search ............... 707/1–10, 707/101, 103, 609, 756, 802, 809; 348/211, 348/572, 222.1; 345/428
See application file for complete search history.

(56) References Cited

U.S. PATENT DOCUMENTS

| | | | | |
|---|---|---|---|---|
| 5,363,487 A | * | 11/1994 | Willman et al. | 710/8 |
| 5,450,504 A | * | 9/1995 | Calia | 382/118 |
| 6,119,118 A | * | 9/2000 | Kain et al. | 707/10 |
| 6,147,742 A | * | 11/2000 | Bell et al. | 355/27 |
| 6,493,028 B1 | * | 12/2002 | Anderson et al. | 348/222.1 |
| 6,549,918 B1 | * | 4/2003 | Probert et al. | 707/203 |
| 6,567,119 B1 | * | 5/2003 | Parulski et al. | 348/207.2 |
| 6,574,377 B1 | * | 6/2003 | Cahill et al. | 382/305 |
| 6,816,277 B2 | * | 11/2004 | Kaltenecker et al. | 358/1.15 |
| 2002/0036710 A1 | * | 3/2002 | Choi | 348/564 |
| 2003/0059199 A1 | * | 3/2003 | Hossain | 386/46 |

FOREIGN PATENT DOCUMENTS

| | | |
|---|---|---|
| EP | 1 039 380 | 9/2000 |
| EP | 0 094 407 | 4/2001 |
| WO | WO 99/27470 | 6/1999 |
| WO | WO 00/52590 | 9/2000 |

* cited by examiner

*Primary Examiner* — Hanh B Thai

(57) ABSTRACT

Embodiments of the present invention provide methods, a digital camera system and a computer-readable medium for processing digital image assets of a digital camera. In one embodiment, a method includes the steps of automatically matching an asset scheme of the digital camera to a best available asset normalizer of a predetermined set of asset normalizers and processing assets of the digital camera into a standard structure in accordance with the best available asset normalizer.

49 Claims, 9 Drawing Sheets

AUTOMATICALLY PROCESSING DIGITAL ASSETS OF A DIGITAL CAMERA

BACKGROUND OF THE INVENTION

The present invention relates to processing of digital camera storage. As cameras have become more advanced, digital cameras have been developed. Digital cameras differ from film-based cameras in that digital cameras record the images in digital form rather than on film. Digital cameras typically use charge-coupled devices (CCDs) or complementary metal oxide semiconductor (CMOS) sensors. A CCD is a collection of light-sensitive diodes or photosites that convert light into electrical charge. The brighter the light, the more electrical charge is produced. A CMOS sensor also converts light into electrical charge. CMOS sensors read each pixel individually, and CCD sensors transport the charge across the chip. The accumulated charge is turned into a digital value. However, the digital camera storage industry is young, and thus, a number of different schemes are being used for storing the digital values for the images. While some digital cameras are manufactured with software that may be used to unload the assets from the associated camera, the assets are generally extracted in the same format in which they were stored and are collected into a single directory.

Most modern digital cameras utilize a file system organization that is similar to the standard Design rule for Camera File system (DCF), JEIDA, 1999.1.7. However, both by specification of the DCF and by practice of the digital camera manufacturers, the organization of the digital assets such as pictures, movies, audio, metadata and the like still varies considerably and still presents a major barrier to the stated goal of allowing digital camera content to be used easily across a variety of software and hardware products. Many users manually transfer the assets of a Digital Still Camera (DSC) to their computers, often in a user-specific manner. Digital cameras lack a standard scheme for storing digital camera image data.

SUMMARY OF THE INVENTION

The present invention provides for automatically processing digital image assets of a digital camera.

DETAILED DESCRIPTION OF THE PREFERRED EMBODIMENT

Figure 1:
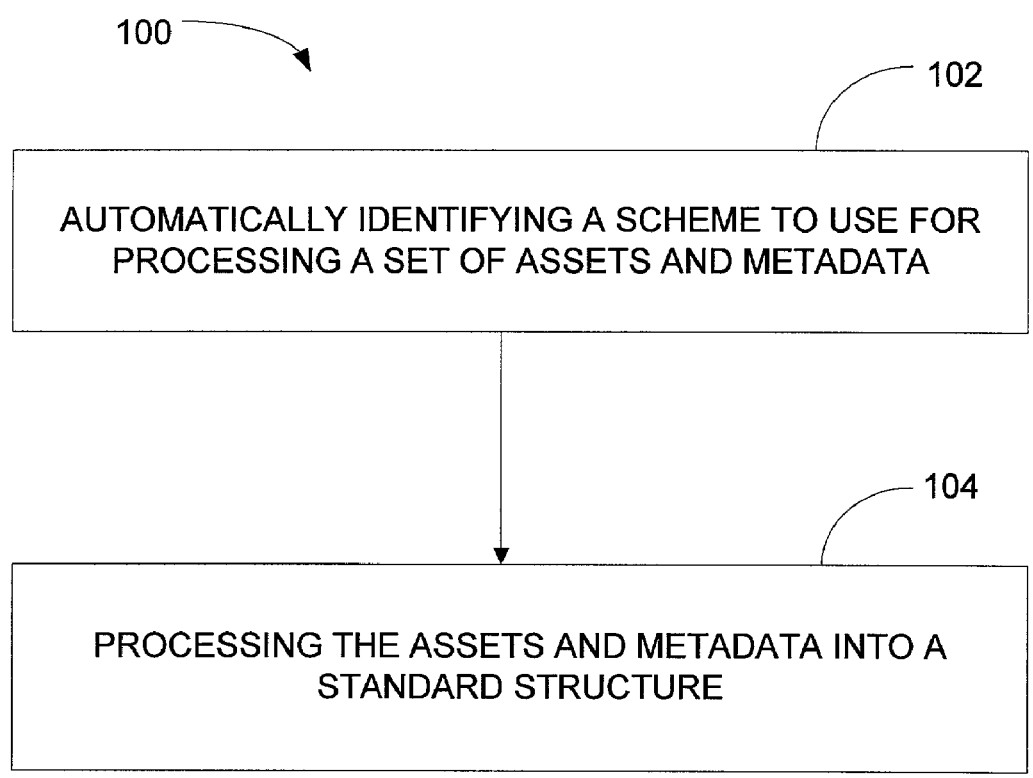
FIG. 1 is a flow chart for steps for a method according to an embodiment of the present invention.

Although users desire to unload their digital cameras and view the stored images, since digital cameras store the digital data/assets using camera-specific organization and naming of captured assets together with associated metadata, processing data from a wide variety of cameras has been problematic. The present invention provides a solution to this problem. As shown in FIG. 1, numeral 100, embodiments of the present invention provide for automatically identifying 102 a scheme to use for processing a particular set of assets and metadata and for processing 104 the assets and metadata into a standard structure, which may be used immediately or later. In one embodiment, automatically identifying the scheme may include comparing the set of assets and metadata with a predetermined set of characterizations of assets and metadata to determine whether a match is present.

Digital still cameras are a popular manufacturing category, with numerous new models regularly appearing from a large number of manufacturers and under many brands. When the digital camera design and manufacturing are outsourced to a variety of outside manufacturers, a further variation appears in the camera design and capabilities, even when the cameras are of the same brand. When a user has used a digital camera to take pictures, video clips, audio clips and the like, the user generally wants to unload the captured assets or data from the camera for further use, such as viewing. Digital cameras generally allow the user to connect the camera directly to a general-purpose computer or specialty electronics device using a cable or wireless connection. Alternatively, many DSCs have removable storage, such as disks or memory cards that the user may remove from the camera and connect to the computer or device using an associated storage connector. In this manner, the captured assets are made accessible by the operating system of the device in the form of a file system in which the captured assets and metadata are organized in a camera-specific collection of files and directories.

Embodiments of the present invention provide for automatic identification of the scheme needed to process a particular set of assets and metadata of unknown origin and for a system of asset normalizing that enables processing the collection of assets and metadata into a standard structure for further use in a more unified fashion.

Asset normalization is the process of converting a collection of assets and metadata which are structured in a plurality of ways as dictated by a variety of devices or processes, into a collection of assets and metadata structured in a consistent fashion dictated by a specific target device or process. The process may include making explicit the identity and purpose of files, the relationships between files, extracting as necessary data and metadata of files, converting, where necessary, the formats of files, attaching associated asset handlers to specific asset types, and other restructuring tasks.

The output of the asset normalization process may be in a number of forms, including a restructured set of files and directories of the original assets, a set of duplicate files and directories restructured into normalized form, or a manifest and index of the original assets that is structured and annotated to represent the assets in a normalized form without duplicating or modifying the original data.

In one embodiment of the present invention, the input to an asset normalizer is a set of specific files and directories in a file system to be processed. In one embodiment, the output of the asset normalizer is an XML-formatted file that contains references to all the files and metadata that the asset normalizer determines are relevant to the set of inputs. This can include additional files discovered by interrogating the file system to discover additional relevant files based on knowledge and heuristics known to the asset normalizer.

The output files' contents adhere to a structure defined by the asset processing schemes that produce results of interest to the user. A set of files and data that are indexed and referenced using this output structure are not represented in a normalized form that can be processed further in a consistent manner regardless of their original file system and asset structure.

For example, the information present in the normalized output structure would allow a single scheme to process those assets into an audio-video presentation that plays back the still images, still images plus audio, video clips and audio clips in the sequence captured, using all of the available data (e.g., still images plus audio). In this manner, the assets may be played back to the user in a user-friendly structure, providing the same experience available to most users by plugging their digital camera's video-out jack directly into an exogenous device such as a television, but which may be otherwise unavailable once the digital assets have been unloaded from the camera.

Asset normalization is known to those skilled in the art, especially in data center operations that assemble and process data acquired from a variety of sources. Those skilled in the art will recognize that there are a variety of possible input content and normalized output structures. The present invention applies the principles of asset normalization to assets coming from digital cameras, where a dynamic set of asset normalizers may be present on the system, and selects an asset normalizer by an automated technique.

The present invention identifies automatically the appropriate asset normalizer to use for particular digital camera assets in a manner that allows the set of available asset normalizers to grow, shrink, and change without restriction. The asset normalizers are managed by a "framework" that includes a set of predetermined available asset normalizers that then identifies a best available asset normalizer for the assets present.

The set of asset normalizers that are available may vary dynamically. For example, a device can ship with basic set of asset normalizers, which can be augmented in a plurality of ways, such as when additional software is added. A digital still camera or other capture device may even include an asset normalizer as part of the asset storage, enabling a collection of assets to also include the asset normalizer software. The framework may arrange to identify the asset normalizer as part of the asset storage and include the framework in the set of available asset normalizers considered during the automatic identification process.

Each asset normalizer presents one or more mechanisms that allow the normalizer to be matched to a given collection of DSC assets. These mechanisms may take many forms, but in general allow an asset normalizer to compare or have compared on its behalf, the various characteristics of the actual asset data in question to the characteristics of that asset data which the asset normalizer requires to enable proper processing, and to assign each comparison a score that represents the degree or quality of the match. From the set of available asset normalizers and the results of the match tests, the framework identifies the asset normalizer that best matches the available asset data.

In one embodiment of the present invention, three pieces of information are represented by each asset normalizer. Each piece of information is a regular expression. Regular expressions are a means to specify a pattern that can be matched not only to a single specific text sequence but also to a variety of text sequences. The three pieces of information associated with each asset normalizer are a directory pattern, a file name pattern, and an image metadata pattern. Each pattern may be arbitrarily complex within the constraints imposed by the regular expression language. A rich regular expression language, such as the "extended regexp" language supported by most Unix™-style operating systems, may suitable for many applications.

The framework requests the three patterns from each asset normalizer. Then, the framework applies each pattern to the appropriate aspect of the asset data and scores the degree of "match" between the asset data and the pattern. After applying each of the patterns of each handler to the asset data, the framework can determine the asset normalizer with the best score. This asset normalizer is then the "best" asset normalizer to apply to the set of asset data. Where none of the patterns of a handler match, no technique may be applied to process the assets or a fallback technique may be applied.

Embodiments of the present invention thus provides an asset normalizer that is specified to work with a very broad variety of camera models, such as all cameras of a single manufacturer, or an asset normalizer may be precisely specified to only work with a specific camera, or may be selected to a desired system that falls between the two stated systems.

In one embodiment, the asset normalizer provides a directory pattern based on the directory names encountered by doing an alphabetical preorder traversal to a depth of two for all directories beneath a given location and concatenating directory names without spaces. The directory pattern is tested for a match with the corresponding characterization of asset data.

In one embodiment, the file name pattern may be assembled by examining JPG, TIF, GIF, MOV, AVI and other image type files in a directory and specifying the pattern that describes possible names. The file name pattern is tested for a match with corresponding actual asset data.

In one embodiment, the image metadata pattern is formed by examining the metadata from representative supported files. The pattern is based on a concatenation of the camera make and camera model metadata, without spaces, embedded in the images from cameras supported by the asset normalizer. During operation, the asset data is characterized by using the camera metadata embedded in the image, such as the information in an EXIF-compliant JPEG image. The image metadata pattern is tested for a match with the corresponding characterization of asset data.

In an embodiment of the present invention, a collection of asset normalizers may be assembled that identify patterns by patterns of file and directory names and camera metadata for which they are designed. A set of available asset normalizers is matched against the unknown digital camera assets, and the asset normalizer with the best pattern match is selected. Then, the selected asset normalizer converts the given collection into a standard structure for processing.

Figure 2:
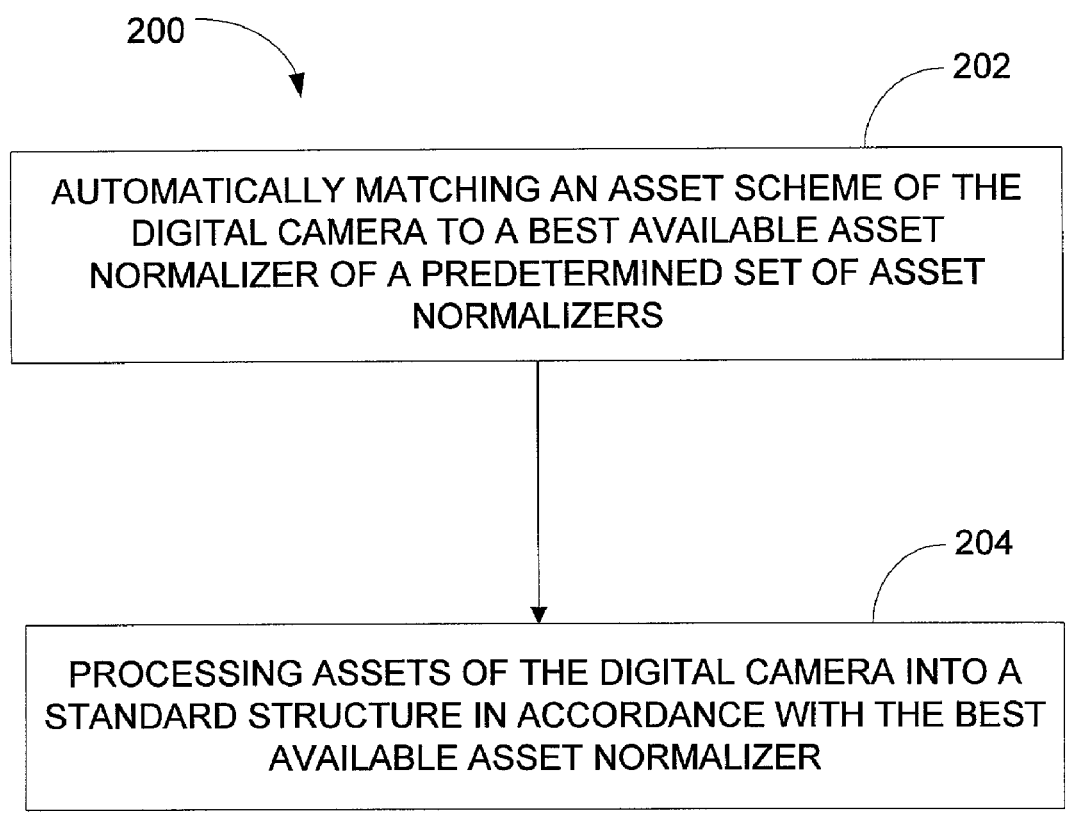
FIG. 2 is a flow chart for steps for a method according to another embodiment of the present invention.

FIG. 2, numeral 200, is a flow chart with one embodiment of steps in accordance with the present invention. The asset normalizing method provides for processing digital image assets of a digital camera, using the steps of automatically matching 202 an asset scheme of the digital camera to a best available asset normalizer of a predetermined set of asset normalizers and processing 204 assets of the digital camera into a standard structure in accordance with the best available asset normalizer. Automatically matching an asset scheme may include, where no match is found, indicating to the user that no match was found. Typically, processing assets of the digital camera comprises asset normalization.

In one embodiment, asset normalization may include at least making explicit an identity and purpose of files, making explicit relationships between files, extracting data and metadata of files, where necessary converting formats of files, or attaching associated asset handlers to specific asset types. In one embodiment, asset normalization may provide an XML-formatted file output that contains references to files and metadata determined to be relevant to a set of inputs. Generally, the XML-formatted file output may include files discovered by interrogating a file system to discover additional relevant files based on an asset normalizer's knowledge and heuristics. In addition, processing may include processing the standard structure into a user-friendly structure that is an audio-video presentation, still images, still images plus audio clips, video clips, and/or audio clips wherein the standard structure is a user-friendly structure that allows viewing and/or hearing information in an exogenous device based on the digital assets from the digital camera.

Figure 3:
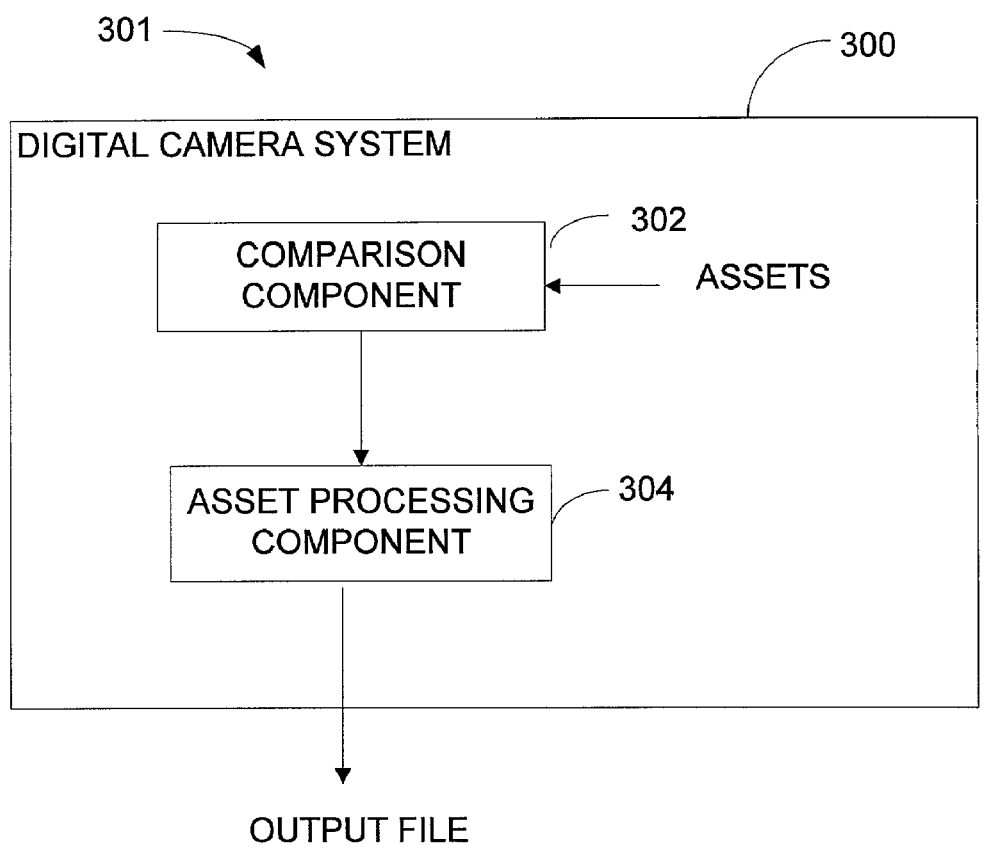
FIG. 3 is a block diagram of a digital camera system according to one embodiment of the present invention.

FIG. 3, numeral 301, is a block diagram of one embodiment of a digital camera system 300 in accordance with the present invention. The digital camera system 300 provides for processing digital image assets into a standard format and includes a comparison component 302 for automatically matching an asset scheme of the digital camera to a best available asset normalizer of a predetermined set of asset normalizers and an asset processing component 304 that is coupled to the comparison component 302. The asset processing component 304 processes assets of the digital camera into a standard format in accordance with the best available asset normalizer. When the comparison component 302 fails to find a matching asset scheme, the component may indicate to the user that no match was found, and/or the component may use a fallback technique.

In one embodiment, the asset processing component 304 implements asset normalization, as described more fully above.

Asset normalization may include making explicit an identity and purpose of files, making explicit relationships between files, extracting data and metadata of files, where necessary converting formats of files, and/or attaching associated asset handlers to specific asset types.

In one embodiment, asset normalization provides an XML-formatted file output that contains references to files and metadata determined to be relevant to a set of inputs. The XML-formatted file output may include files discovered by interrogating a file system to discover additional relevant files based on an asset normalizer's knowledge and heuristics, and where desired, may provide for processing the standard format into a user-friendly structure for an audio-video presentation, still images, still images plus audio clips, video clips, and/or audio clips. Also, where desired, the processing may provide for viewing and/or hearing the user-friendly structure in an exogenous device such as, for example, a television.

In one embodiment, the comparison component 302 may assign each comparison a score that represents a quality of a match, where a highest score is the score that represents the quality of a best match.

Figure 4:
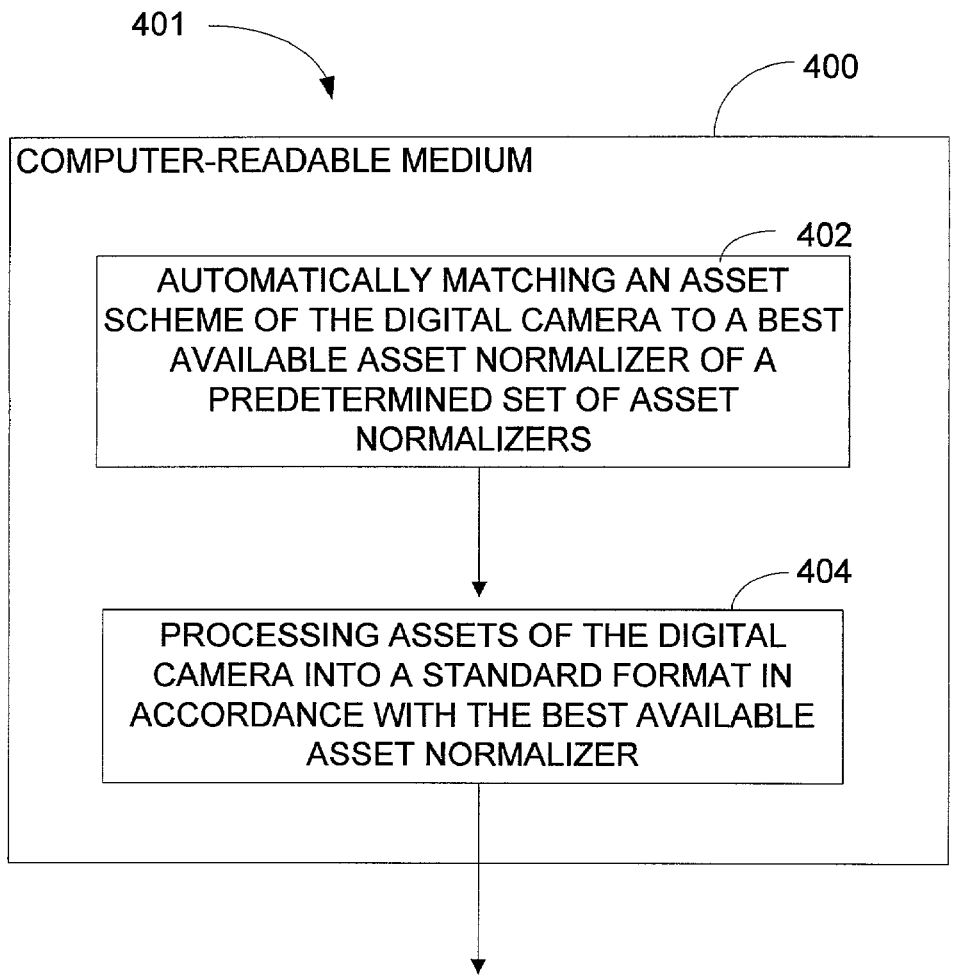
FIG. 4 is a block diagram of a computer-readable medium according to one embodiment of the present invention.

FIG. 4, numeral 401, is a block diagram of one embodiment of a computer-readable medium 400 in accordance with the present invention. The computer-readable medium 400 contains instructions for processing digital image assets from a digital camera into a standard format by automatically matching 402 an asset scheme of the digital camera to a best available asset normalizer of a predetermined set of asset normalizers and processing assets 404 of the digital camera into a standard format in accordance with the best available asset normalizer. Where desired, automatically matching the asset scheme and processing the assets may be further characterized as described more fully in the description of FIG. 4 above.

Figure 5A:
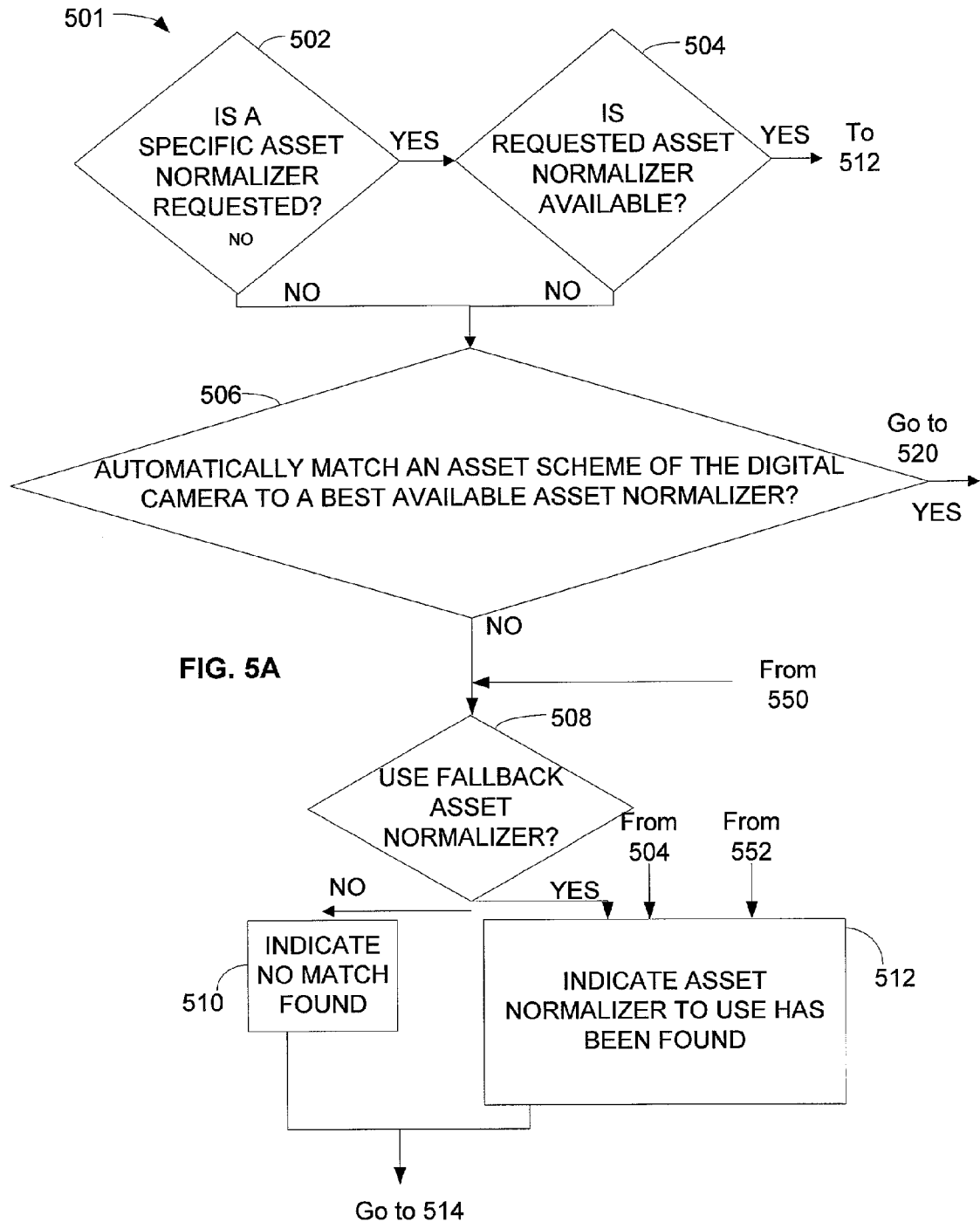
FIGS. 5A-5D and 6 are flow charts for steps for a method according to an embodiment of the present invention.

FIGS. 5A-5D and 6 set forth one embodiment of implementing a method of the present invention. FIG. 5A, numeral 501, sets forth steps of determining if a specific asset normalizer is requested 502, and determining if the requested asset normalizer is available 504. If the answer to both 502 and 504 is yes, the user proceeds to the step 512 indicating an asset normalizer to use has been found. If the answer to either 502 or 504 is no, the system determines whether to match, automatically, an asset scheme of the digital camera to a best available asset normalizer 506. If automatically matching an asset scheme is selected, step 520 of inquiring whether to match by directory names is implemented. See below for further steps beyond step 520.

Figure 5B:
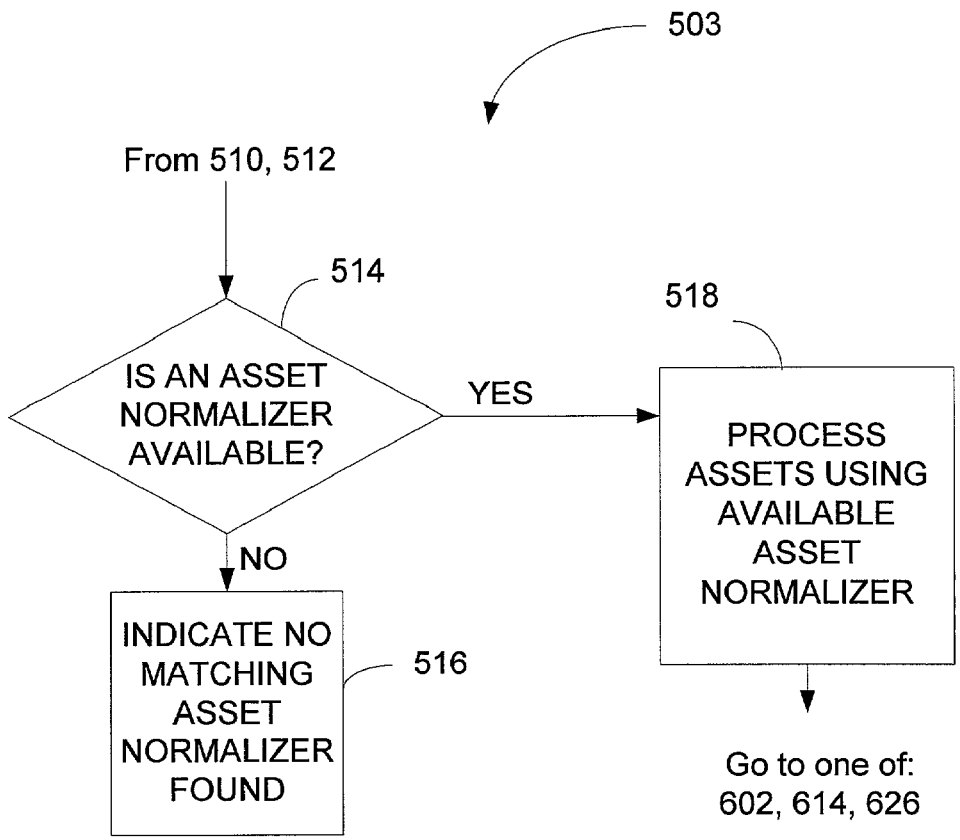
Figure 6:
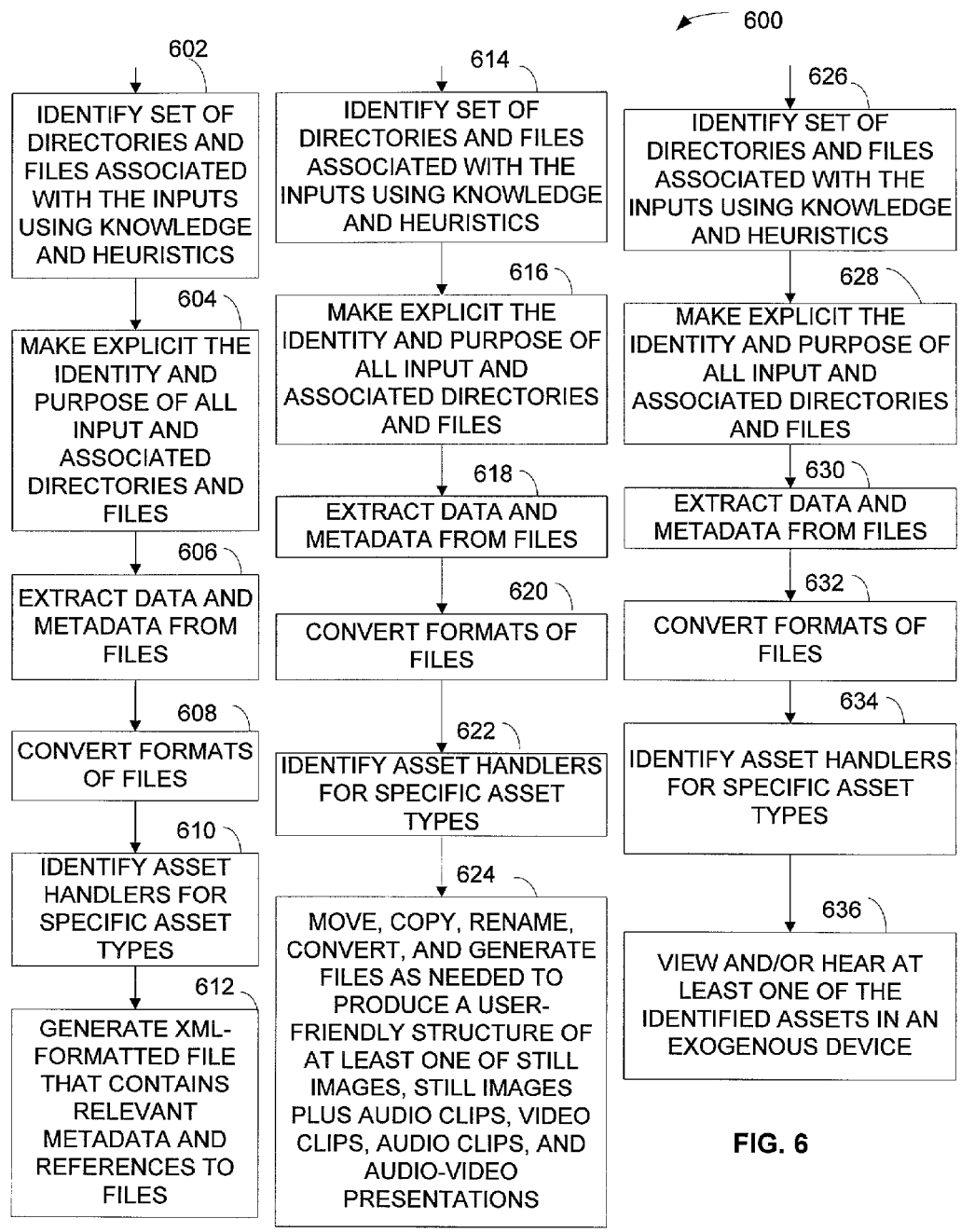

If an asset scheme of the digital camera is not to be matched to a best available asset normalizer, the steps of determining whether to use a fallback asset normalizer 508 is implemented. As shown in FIG. 5B, numeral 503, whether an asset normalizer is found 512 or no match is found 510, a determination is made whether an asset normalizer is available 514. If an asset normalizer is available, the assets may be processed using the available asset normalizer 518, for example, as shown in FIG. 6 (see further description below). If no asset normalizer is available, an indication is provided showing that no matching asset normalizer was found 516.

Figure 5C:
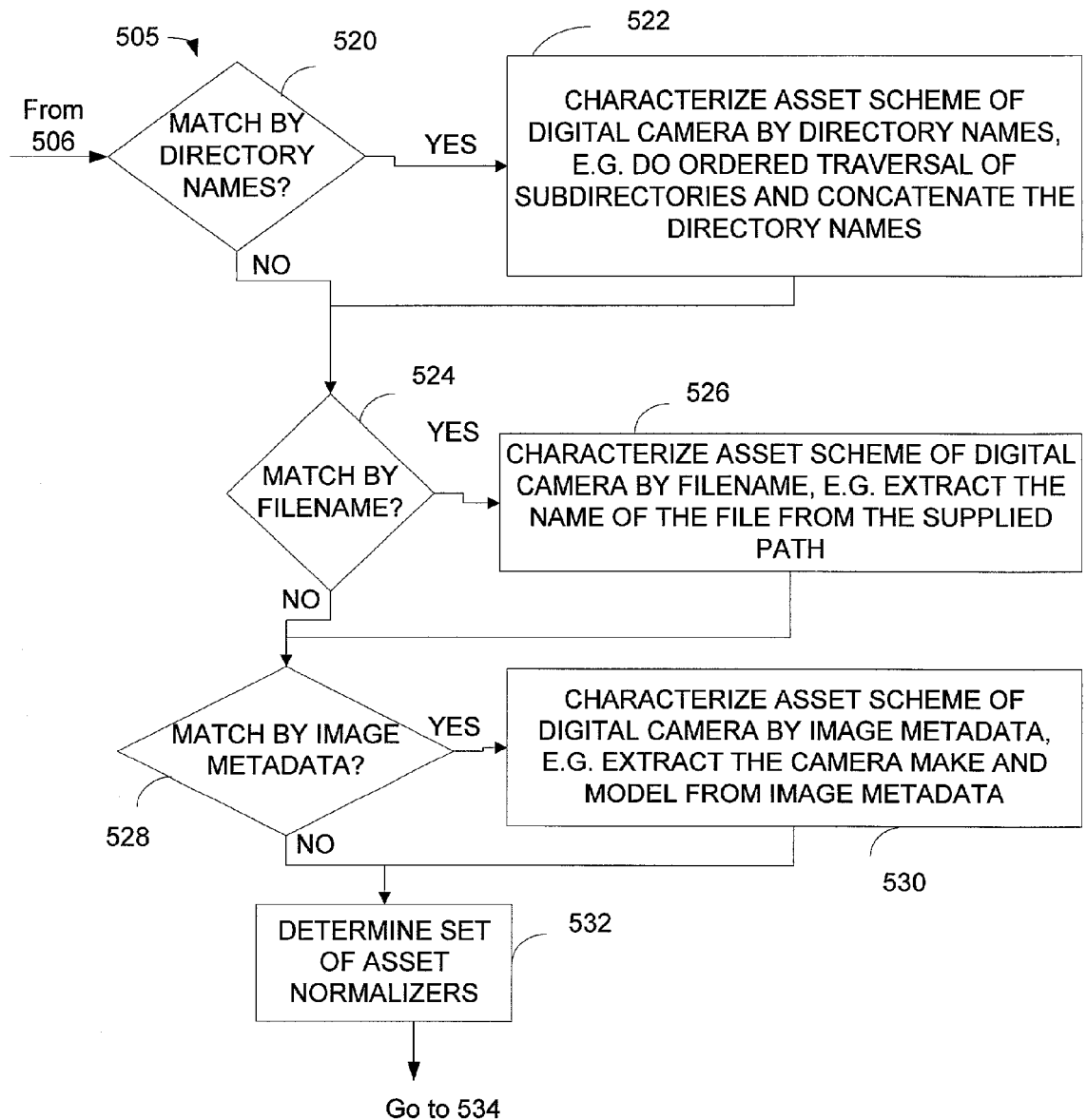

As shown in FIG. 5C, numeral 505, 520 tests if there is to be a match by directory names. If there is to be a match by directory names, the asset scheme of the digital camera is characterized by directory names 522. For example, an ordered transversal of subdirectories may be made and the directory names may be concatenated. Next, whether or not there is to be directory name matching, step 524 tests if there is to be a match by filename. If there is to be a match by filename, the asset scheme of the digital camera may be characterized by filename 526. For example, the name of the file may be extracted from a supplied path. Next, whether or not there is to be filename matching, step 528 tests if there is to be a match by image metadata. If there is a match by image metadata, the asset scheme of the digital camera may be characterized by the image metadata 530. For example, the camera make and/or model may be extracted from the image metadata as characterization properties. Next, a set of asset normalizers is determined 532.

Figure 5D:
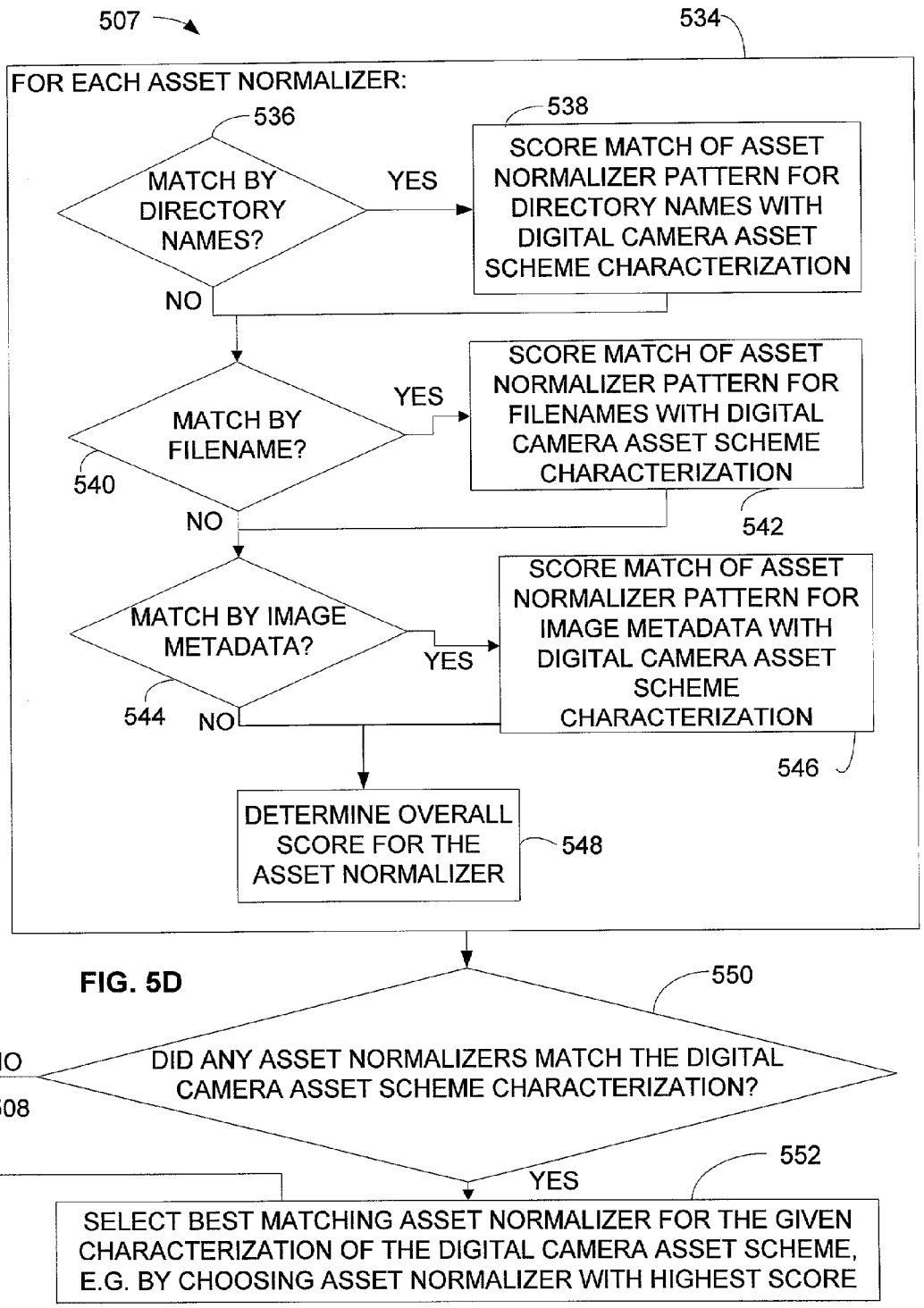

Next, as shown in FIG. 5D, numeral 507, for each asset normalizer, a set of steps 534 may be used to determine the overall score for the asset normalizer. First, step 536 tests whether directory names are to be checked for a match. If so, the match of the asset normalizer pattern for directory names may be scored using a digital camera asset scheme characterization 538. Then, whether or not there was directory name matching, the step 540 tests whether filenames are to be checked for a match. If so, the match of the asset normalizer pattern for filenames may be scored using a digital camera asset scheme characterization 542. Then, whether or not there was filename matching, step 544 tests whether the image metadata is to be checked for a match. If so, the match of an asset normalizer pattern for image metadata may be scored using a digital camera asset scheme characterization 546. Whether or not there was image metadata matching, an overall score is determined for the asset normalizer 548. Next, a query is made to determine whether any asset normalizers have been found to match the digital camera asset scheme characterization 550. If no asset normalizers have been found to match, query 508 is implemented (see above for remaining steps). If at least one asset normalizer is found to match the digital camera asset scheme characterization, a best matching asset normalizer is selected for the digital camera asset scheme 552. For example, in one embodiment, an asset normalizer with a highest score may be selected. Next, step 512 is implemented.

Thus, methods, a digital camera system and a computer-readable medium have been described according to the present invention. Many modifications and variations may be made to the techniques and structures described and illustrated herein without departing from the spirit and scope of the invention. Accordingly, it should be understood that the methods, a digital camera system and a computer-readable medium described herein are illustrative only and are not limiting upon the scope of the invention.

What is claimed is:

1. A method for automatically processing digital image assets of a digital camera, comprising the steps of:
   receiving a set of assets and metadata from a digital camera that have been organized by the digital camera into a camera asset organization structure;
   automatically identifying a selected restructuring scheme from a plurality of restructuring schemes to use for processing the camera asset organization structure of the set of assets and metadata; and
   processing the set of assets and metadata using the selected restructuring scheme to convert the camera asset organization structure into a selected organization structure.

2. The method of claim 1 wherein automatically identifying the selected restructuring scheme comprises comparing the set of assets and metadata with a predetermined set of characterizations of assets and metadata to determine whether a match is present, and
   where the camera asset organization structure is a file system and the digital image assets comprise one or more files.

3. The method of claim 2 wherein automatically identifying the selected restructuring scheme includes, where no match is found, indicating to the user that no match was found.

4. The method of claim 2 wherein automatically identifying the selected restructuring scheme includes, where no match is found, applying a fallback scheme.

5. The method of claim 2 wherein processing the set of assets and metadata into the selected organization structure comprises applying asset normalization.

6. The method of claim 5 wherein applying the asset normalization includes at least one of: making explicit an identity and purpose of files, making explicit relationships between files, extracting data and metadata of files, and attaching associated asset handlers to specific asset types.

7. The method of claim 5 wherein applying the asset normalization provides a file output that contains references to files and metadata determined to be relevant to a set of inputs.

8. The method of claim 7 wherein the file output includes files discovered by interrogating a file system to discover additional relevant files based on an asset normalizer's knowledge and heuristics.

9. The method of claim 1 wherein processing includes processing the selected organization structure into a user-friendly structure that is one of: an audio-video presentation, still images, still images plus audio clips, video clips, and audio clips.

10. The method of claim 9 wherein processing includes processing the selected organization structure to provide for at least one of viewing and hearing the user-friendly structure in an exogenous device.

11. The method of claim 1 wherein automatically identifying a selected restructuring scheme to use for processing a set of assets and metadata includes using a framework having a set of available asset normalizers to identify an available asset normalizer.

12. An asset normalizing method for processing a collection of digital image assets of a digital camera where the collection of digital image assets are organized according to an asset organization scheme generated by the digital camera, comprising the steps of:
   automatically matching the asset organization scheme of the digital camera to a selected asset normalizer of a predetermined set of asset normalizers; and
   processing the collection of digital image assets of the digital camera into a selected standard organization structure in accordance with the selected asset normalizer.

13. The method of claim 12 wherein automatically matching an asset organization scheme includes comparing the set of digital image assets and metadata with a predetermined set of characterizations of assets and metadata to determine whether a match is present.

14. The method of claim 12 wherein automatically matching an asset organization scheme includes, where no match is found, indicating to the user that no match was found.

15. The method of claim 12 wherein automatically matching an asset organization scheme includes, where no match is found, applying a fallback asset normalizer.

16. The method of claim 12 wherein processing the collection of digital image assets of the digital camera comprises asset normalization that normalizes the asset organization scheme of the digital camera into the selected standard organization structure.

17. The method of claim 16 wherein asset normalization includes at least one of: making explicit an identity and purpose of files, making explicit relationships between files, extracting data and metadata of files, and attaching associated asset handlers to specific asset types.

18. The method of claim 16 wherein asset normalization provides a file output that contains references to files and metadata determined to be relevant to a set of inputs.

19. The method of claim 18 wherein the file output includes files discovered by interrogating a file system to discover additional relevant files based on an asset normalizer's knowledge and heuristics.

20. The method of claim 12 wherein processing includes processing the standard organization structure into a user-friendly structure that is at least one of: an audio-video presentation, still images, still images plus audio clips, video clips, and audio clips.

21. The method of claim 12 wherein processing includes providing for at least one of: viewing and hearing assets selected by the selected asset normalizer in an exogenous device.

22. A computer-readable medium in a digital camera system for processing a camera-specific file system organization scheme of digital image assets into a non-camera specific file system organization format, the computer readable medium comprising:
   a comparison component for automatically matching the camera-specific file system organization scheme of the digital camera to a selected asset organization normalizer of a predetermined set of asset organization normalizers; and
   an asset-processing component, coupled to the comparison component, for organizing the digital image assets of the digital camera into a non-camera specific file system organization format in accordance with the selected asset normalizer to allow the digital image assets to be processed by a variety of devices.

23. The computer-readable medium of claim 22 wherein the comparison component includes comparing the set of digital image assets and metadata with a predetermined set of characterizations of assets and metadata to determine whether a match is present.

24. The computer-readable medium of claim 22 wherein the comparison component includes information that includes at least one of: a directory pattern, a file name pattern, and an image metadata pattern.

25. The computer-readable medium of claim 22 wherein a directory pattern is assembled by an ordered transversal to a depth of at least one directory beneath a predetermined location and concatenating directory names with or without separator characters or symbols.

26. The computer-readable medium of claim 22 wherein, when the comparison component fails to find a matching asset organization normalizer, the comparison component indicates to the user that no match was found.

27. The computer-readable medium of claim 22 wherein, when the comparison component fails to find a matching asset organization normalizer, the asset-processing component utilizes a fallback asset normalizer.

28. The computer-readable medium of claim 22 wherein the asset-processing component implements asset normalization.

29. The computer-readable medium of claim 28 wherein asset normalization includes at least one of: making explicit an identity and purpose of files, making explicit relationships between files, extracting data and metadata of files, and attaching associated asset handles to specific asset types.

30. The computer-readable medium of claim 28 wherein asset normalization provides a file output that contains references to files and metadata determined to be relevant to a set of inputs.

31. The computer-readable medium of claim 30 wherein the file output includes files discovered by interrogating a file system to discover additional relevant files based on an asset normalizer's knowledge and heuristics.

32. The computer-readable medium of claim 22 where processing includes processing the non-camera specific organization format into a user-friendly structure that is at least one of: an audio-video presentation, still images, still images plus audio clips, video clips, and audio clips.

33. The computer-readable medium of claim 22 wherein processing includes processing the non-camera specific organization format and providing for at least one of: viewing and hearing assets selected by the asset normalizer in an exogenous device.

34. The computer-readable medium of claim 22 wherein the comparison component assigns each comparison a score that represents a quality of a match between the camera-specific organization scheme and each of the predetermined set of asset organization normalizers.

35. The computer-readable medium of claim 34 wherein a highest score is the score that represents the quality of an optimal match.

36. A computer-readable medium containing instructions for processing a collection of digital image assets from a digital camera that are organized in a first organization format based on an asset organization scheme into a second organization format by:
   automatically matching the asset organization scheme of the digital camera to a selected asset organization normalizer of a predetermined set of asset organization normalizers that is capable of processing the asset organization scheme; and
   processing the collection of assets of the digital camera into the second organization format in accordance with the selected asset organization normalizer.

37. The computer-readable medium of claim 36 wherein automatically matching the asset organization scheme of the digital camera to the selected asset organization normalizer of a predetermined set of asset organization normalizers includes comparing the set of assets and metadata with a predetermined set of characterizations of assets and metadata to determine whether a match is present.

38. The computer-readable medium of claim 36 wherein automatically matching an asset organization scheme of the digital camera to the selected asset organization normalizer of a predetermined set of asset normalizers includes using information that includes at least one of: a directory pattern, a file name pattern, and an image metadata pattern.

39. The computer-readable medium of claim 38 wherein a directory pattern is assembled by an ordered transversal to a depth of at least one directory beneath a predetermined location and concatenating directory names with or without separator characters or symbols.

40. The computer-readable medium of claim 36 wherein, when a matching asset organization scheme fails to be found, the step of automatically matching the asset organization scheme includes indicating that no match was found.

41. The computer-readable medium of claim 36 wherein when a matching asset organization scheme fails to be found, the step of automatically matching the asset organization scheme includes, where no match is found, applying a fallback asset organization normalizer.

42. The computer-readable medium of claim 36 wherein processing the collection of assets includes implementing asset normalization.

43. The computer-readable medium of claim 42 wherein asset normalization includes at least one of: making explicit an identity and purpose of files, making explicit relationships between files, extracting data and metadata of files, and attaching associated asset handlers to specific asset types.

44. The computer-readable medium of claim 42 wherein asset normalization provides a file output that contains references to files and metadata determined to be relevant to a set of inputs.

45. The computer-readable medium of claim 44 wherein the file output includes references to files discovered by interrogating a file system to discover additional relevant files based on an asset normalizer's knowledge and heuristics.

46. The computer-readable medium of claim 36 wherein processing the collection of assets of the digital camera into the second organization format in accordance with the selected asset organization normalizer includes processing the second organization format into a user-friendly structure that is at least one of: an audio-video presentation, still images, still images plus audio clips, video clips, and audio clips.

47. The computer-readable medium of claim 36 wherein processing includes providing instructions for at least one of: viewing and hearing assets selected by the selected asset organization normalizer in an exogenous device.

48. The computer-readable medium of claim 36 wherein automatically matching the asset organization scheme of the digital camera to the selected asset organization normalizer of a predetermined set of asset organization normalizers includes assigning each comparison a score that represents a quality of a match.

49. The computer-readable medium of claim 48 wherein a highest score is a score that represents the quality of a best match.

* * * * *

UNITED STATES PATENT AND TRADEMARK OFFICE
CERTIFICATE OF CORRECTION

PATENT NO. : 7,917,466 B2
APPLICATION NO. : 10/080971
DATED : March 29, 2011
INVENTOR(S) : Pieter J. van Zee It is certified that error appears in the above-identified patent and that said Letters Patent is hereby corrected as shown below:

In column 7, line 56, in Claim 10, delete "of" and insert -- of: --, therefor.

In column 9, line 23, in Claim 29, delete "handles" and insert -- handlers --, therefor.

Signed and Sealed this
Twelfth Day of July, 2011

David J. Kappos
*Director of the United States Patent and Trademark Office*